(12) United States Patent
Pu et al.

(10) Patent No.: US 11,048,601 B2
(45) Date of Patent: Jun. 29, 2021

(54) DISK DATA READING/WRITING METHOD AND DEVICE

(71) Applicant: Hangzhou Hikvision Digital Technology Co., Ltd., Zhejiang (CN)

(72) Inventors: Shiliang Pu, Zhejiang (CN); Min Ye, Zhejiang (CN); Peng Lin, Zhejiang (CN); Qiqian Lin, Zhejiang (CN); Weichun Wang, Zhejiang (CN)

(73) Assignee: Hangzhou Hikvision Digital Technology Co., Ltd., Zhejiang (CN)

( * ) Notice: Subject to any disclaimer, the term of this patent is extended or adjusted under 35 U.S.C. 154(b) by 154 days.

(21) Appl. No.: 16/348,248

(22) PCT Filed: Sep. 13, 2017

(86) PCT No.: PCT/CN2017/101628
§ 371 (c)(1),
(2) Date: May 8, 2019

(87) PCT Pub. No.: WO2018/086409
PCT Pub. Date: May 17, 2018

(65) Prior Publication Data
US 2019/0317698 A1   Oct. 17, 2019

(30) Foreign Application Priority Data

Nov. 8, 2016 (CN) .......................... 201610979543.1

(51) Int. Cl.
*G06F 11/00* (2006.01)
*G06F 11/20* (2006.01)
*G06F 3/06* (2006.01)

(52) U.S. Cl.
CPC .......... *G06F 11/2094* (2013.01); *G06F 3/064* (2013.01); *G06F 11/2056* (2013.01)

(58) Field of Classification Search
CPC ............. G06F 11/1456; G06F 11/1469; G06F 11/2056; G06F 11/2094; G06F 3/064
See application file for complete search history.

(56) References Cited

U.S. PATENT DOCUMENTS 8,006,125 B1 * 8/2011 Meng .................. G06F 11/1417
714/6.2
2007/0266037 A1   11/2007 Terry et al.
(Continued)

FOREIGN PATENT DOCUMENTS

CN        101501623 A        8/2009
CN        101814044 A        8/2010
(Continued)

*Primary Examiner* — Michael Maskulinski
(74) *Attorney, Agent, or Firm* — Bret E. Field; Bozicevic, Field & Francis LLP

(57) ABSTRACT

The embodiments of the present disclosure disclose a method and apparatus for reading or writing disk data. The disk includes a primary metadata block storing metadata, a backup metadata block for backing up metadata, and at least one object block group. Each object block group includes a data block storing object data, and an index block storing an index of the object data. The primary metadata block is located at a head of the disk; and the backup metadata block is located at a tail of the disk. The at least one object block group is located between the primary metadata block and the backup metadata block. In reading or writing object data, the index in the index block, the metadata in the primary metadata block and the metadata backed up in the backup metadata block can be separately operated. By applying the embodiments of the present disclosure, the life and security of the disk are increased.

12 Claims, 7 Drawing Sheets

(56) References Cited

U.S. PATENT DOCUMENTS

| | | |
|---|---|---|
| 2016/0048332 A1 | 2/2016 | Kimmel et al. |
| 2016/0092326 A1* | 3/2016 | Wu .................... G06F 11/2094 714/6.3 |
| 2016/0224601 A1 | 8/2016 | Larson |
| 2017/0139615 A1* | 5/2017 | Olson ................... G06F 3/0619 |
| 2018/0018238 A1* | 1/2018 | Tomii .................. G06F 11/1461 |

FOREIGN PATENT DOCUMENTS

| | | |
|---|---|---|
| CN | 103593477 A | 2/2014 |
| CN | 104866497 A | 8/2015 |
| CN | 104991747 A | 10/2015 |
| CN | 105117351 A | 12/2015 |
| CN | 105224626 A | 1/2016 |
| CN | 105528053 A | 4/2016 |
| EP | 3037988 A1 | 6/2016 |
| WO | WO2014091629 A1 | 6/2014 |

* cited by examiner

DISK DATA READING/WRITING METHOD AND DEVICE

The present disclosure claims the priority to a Chinese patent application No. 201610979543.1 filed with the China National Intellectual Property Administration on Nov. 8, 2016 and entitled "Method and Apparatus for Reading or Writing Disk Data", which is incorporated herein by reference in its entirety.

TECHNICAL FIELD

The present disclosure relates to the field of computer technology, and in particular to a method and apparatus for reading or writing disk data.

BACKGROUND

At present, as shown in FIG. 1, a disk is divided into two storage areas, which are an index area and a data area respectively. Object data is collectively stored in object blocks of the data area and primary critical data and backup critical data are collectively stored in the object blocks of the index area. The critical data includes an index of metadata and of the object data, and the metadata includes boot information, metadata description information, a block bitmap, a bad block bit, and allocation information of the index. Here, the object blocks that store critical data include:

a boot block for storing boot information, including an identifier of an metadata description block and a size of a storage space occupied by the metadata description block;

a metadata description block for storing metadata description information, including an identifier of a block bitmap block, an identifier of a bad block bitmap block, and an identifier of an index allocation information block, as well as a size of a storage space occupied by the block bitmap block, the bad block bitmap block, and the index allocation information block;

the block bitmap block for storing a block bitmap, including usage information of each object block;

the bad block bitmap block that is opposite to the block bitmap block; here, if one of the object blocks damages, this object block may be referred to as a bad block;

the index allocation information block for storing allocation information of the index, including an identifier of each index block and a size of a storage space occupied by the index block;

the index block for storing an index of the object data, including: an identifier of the object block occupied by the object data and a size of a storage space occupied by the object block.

Reading/writing object data needs to read/write critical data, while the critical data is collectively stored in the object block of the index area. When the object data is read and written, the operation on the critical data will be concentrated on the object block of the index area, that is, is concentrated in the index area. In this case, it is easy to index and access hotspot data, that is, it is easy to cause too high operation frequency of the index area, damaging the disk and reducing the life and security of the disk.

SUMMARY

The embodiments of the present disclosure disclose a method and apparatus for reading or writing disk data, so as to improve the service life and security of the disk.

To achieve the above objective, an embodiment of the present disclosure discloses a method for reading disk data. The disk includes a primary metadata block storing metadata, a backup metadata block for backing up the metadata, and at least one object block group; each object block group includes a data block storing object data, and an index block storing an index of the object data; the primary metadata block is located at a head of the disk; the backup metadata block is located at a tail of the disk; the at least one object block group is located between the primary metadata block and the backup metadata block. The method includes:

receiving a read instruction for target object data;

determining a first data block corresponding to the target object data according to an identifier of the target object data, the metadata in the primary metadata block, the metadata backed up in the backup metadata block, and an index in the index block in each object block group, and determining a first object block group in which the first data block is located; and reading the target object data from the first data block of the first object block group.

Optionally, the index block includes a primary index block and a backup index block; the primary index block is configured to store an index of object data, and the backup index block is configured to back up the index of the object data;

for each object block group, a primary index block in the object block group is located at a head of the object block group, and a backup index block in the object block group is located at a tail of the object block group; a data block in the object block group is located between the primary index block and the backup index block of the object block group;

the step of determining a first data block corresponding to the target object data according to an identifier of the target object data, the metadata in the primary metadata block, the metadata backed up in the backup metadata block, and an index in the index block in each object block group, and determining a first object block group in which the first data block is located includes:

reading the metadata in the primary metadata block and/or the metadata backed up in the backup metadata block, and determining locations of the primary index block and the backup index block in each object block group;

reading the index in the primary index block or the index backed up in the backup index block at the determined locations; and determining the first data block corresponding to the target object data according to the read index and the identifier of the target object data, and determining the first object block group in which the first data block is located.

Optionally, the disk further includes at least one reserved block; and the method further includes:

when reading the metadata in the primary metadata block fails, or reading the metadata backed up in the backup metadata block fails, or reading the index in the primary index block in each object block group fails, or reading the index backed up in the backup index block in each object block group fails, determining the object block whose reading operation fails as a suspected bad block, re-writing and/or re-reading object data into/from the suspected bad block;

if re-writing and/or re-reading the object data succeeds, repairing data in the suspected bad block according to primary and backup redundant data;

if re-writing and/or re-reading the object data fails, obtaining a reserved block and replacing the suspected bad block with the reserved block; overwriting the obtained reserved block according to the primary and backup redundant data, and updating the metadata in the primary metadata block and the metadata backed up in the backup metadata block.

Optionally, the step of determining the a data block corresponding to the target object data according to an identifier of the target object data, the metadata in the primary metadata block, the metadata backed up in the backup metadata block, and an index in the index block in each object block group includes:

calculating a first index check value of the identifier of the target object data;

acquiring an identifier of the first data block and a first data length for the first index check value from a preset index database; wherein the preset index database is configured to store a corresponding relationship among an index check value, an identifier of a data block, and a data length; the index check value stored in the preset index database is determined according to the metadata in the primary metadata block, the metadata backed up in the backup metadata block, and the index in the index block in each object block group;

determining the first data block according to the identifier of the first data block;

the step of reading the target object data from the first data block of the first object block group includes:

reading the target object data with the first data length from the first data block of the first object block group.

To achieve the above objective, an embodiment of the present disclosure further discloses a method for writing disk data, wherein a disk includes: a primary metadata block storing metadata, a backup metadata block for backing up the metadata, and at least one object block group; each object block group includes: a data block storing object data, and an index block storing an index of the object data; the primary metadata block is located at a head of the disk; and the backup metadata block is located at a tail of the disk; the at least one object block group is located between the primary metadata block and the backup metadata block; the method includes:

receiving a writing instruction for target object data;

determining an idle first data block in the at least one object block group, and determining a first object block group corresponding to the first data block; and writing the target object data into the first data block of the first object block group, and updating an index in an index block in the first object block group, the metadata in the primary metadata block and the metadata backed up in the backup metadata block according to an identifier of the target object data.

Optionally, the index block includes a primary index block and a backup index block; the primary index block is configured to store an index of object data, and the backup index block is configured to back up the index of the object data;

for each object block group, a primary index block in the object block group is located at a head of the object block group, and a backup index block in the object block group is located at a tail of the object block group; a data block in the object block group is located between the primary index block and the backup index block of the object block group;

the step of updating an index in an index block in the first object block group, the metadata in the primary metadata block and the metadata backed up in the backup metadata block according to an identifier of the target object data includes:

writing the identifier of the target object data as an index into a primary index block in the first object block group, writing the identifier of the target object data as an index into a backup index block in the first object block group, updating metadata corresponding to the first data block in the primary metadata block, and backing up the metadata corresponding to the first data block into the backup metadata block.

Optionally, the disk further includes at least one reserved block; the method further includes:

when updating the index in the primary index block in the first object block group fails, or updating the index backed up in the backup index block in the first object block group fails, or updating the metadata in the primary metadata block fails, or updating the metadata backed up in the backup metadata block fails, determining the object block whose updating operation fails as a suspected bad block, re-writing and/or re-reading object data into/from the suspected bad block;

if re-writing and/or re-reading the object data succeeds, repairing critical data in the suspected bad block according to primary and backup redundant data;

if re-writing and/or re-reading the object data fails, obtaining a reserved block and replacing the suspected bad block with the reserved block; overwriting the obtained reserved block according to the primary and backup redundant data, and updating the metadata in the primary metadata block and the metadata backed up in the backup metadata block.

Optionally, after updating an index in an index block in the first object block group, the metadata in the primary metadata block and the metadata backed up in the backup metadata block according to an identifier of the target object data, the method further includes:

calculating a first index check value of the identifier of the target object data; and storing the first index check value, the identifier of the first data block, and a first data length of the target object data into a preset index database correspondingly; wherein the preset index database is configured to store a corresponding relationship among an index check value, an identifier of a data block, and a data length.

In order to achieve the above objective, an embodiment of the present disclosure further discloses an apparatus for reading disk data, wherein a disk includes a primary metadata block storing metadata, a backup metadata block for backing up the metadata, and at least one object block group; each object block group includes a data block storing object data, an index block storing an index of the object data; the primary metadata block is located at a head of the disk; the backup metadata block is located at a tail of the disk; the at least one object block group is located between the primary metadata block and the backup metadata block; the apparatus includes:

an instruction receiving unit, configured for receiving a read instruction for target object data;

an information determining unit, configured for determining a first data block corresponding to the target object data according to an identifier of the target object data, the metadata in the primary metadata block, the metadata backed up in the backup metadata block, and an index in the index block in each object block group, and determining a first object block group in which the first data block is located; and a data reading unit, configured for reading the target object data from the first data block of the first object block group.

Optionally, wherein, the index block includes a primary index block and a backup index block; the primary index block is configured to store an index of object data, and the backup index block is configured to back up the index of the object data;

for each object block group, a primary index block in the object block group is located at a head of the object block group, and a backup index block in the object block group is located at a tail of the object block group; a data block in the object block group is located between the primary index block and the backup index block of the object block group;

the information determining unit is configured for:

reading the metadata in the primary metadata block and/or the metadata backed up in the backup metadata block, and determining locations of the primary index block and the backup index block in each object block group;

reading the index in the primary index block or the index backed up in the backup index block at the determined locations; and determining the first data block corresponding to the target object data according to the read index and the identifier of the target object data, and determining the first object block group in which the first data block is located.

Optionally, the disk further includes at least one reserved block; the apparatus further includes:

a bad block determining unit, configured for, when reading the metadata in the primary metadata block fails, or reading the metadata backed up in the backup metadata block fails, or reading the index in the primary index block in each object block group fails, or reading the index backed up in the backup index block in each object block group fails, determining the object block whose reading operation fails as a suspected bad block, and re-writing and/or re-reading object data into/from the suspected bad block;

a data repairing unit, configured for, if re-writing and/or re-reading the object data succeeds, repairing data in the suspected bad block according to primary and backup redundant data; and a data overwriting unit, configured for, if re-writing and/or re-reading the object data fails, obtaining a reserved block and replacing the suspected bad block with the reserved block; overwriting the obtained reserved block according to the primary and backup redundant data, and updating the metadata in the primary metadata block and the metadata backed up in the backup metadata block.

Optionally, the information determining unit is configured for:

calculating a first index check value of the identifier of the target object data;

acquiring an identifier of the first data block and a first data length for the first index check value from a preset index database; wherein the preset index database is configured to store a corresponding relationship among an index check value, an identifier of a data block, and a data length; the index check value stored in the preset index database is determined according to the metadata in the primary metadata block, the metadata backed up in the backup metadata block, and the index in the index block in each object block group; and determining the first data block according to the identifier of the first data block, and determining the first object block group in which the first data block is located;

the data reading unit is configured for:

reading the target object data with the first data length from the first data block of the first object block group.

In order to achieve the above objective, an embodiment of the present disclosure further discloses an apparatus for writing disk data, wherein a disk includes a primary metadata block storing metadata, a backup metadata block for backing up the metadata, and at least one object block group; each object block group includes a data block storing object data, and an index block storing an index of object data; the primary metadata block is located at a head of the disk; the backup metadata block is located at a tail of the disk; the at least one object block group is located between the primary metadata block and the backup metadata block; the apparatus includes:

an instruction receiving unit, configured for receiving a writing instruction for target object data;

an information determining unit, configured for determining an idle first data block in the at least one object block group, and determining a first object block group corresponding to the first data block; and a data writing unit, configured for writing the target object data into the first data block of the first object block group, and updating an index in an index block in the first object block group, the metadata in the primary metadata block and the metadata backed up in the backup metadata block according to an identifier of the target object data.

Optionally, the index block includes a primary index block and a backup index block; the primary index block is configured to store an index of object data, and the backup index block is configured to back up the index of the object data;

for each object block group, a primary index block in the object block group is located at a head of the object block group, and a backup index block in the object block group is located at a tail of the object block group; a data block in the object block group is located between the primary index block and the backup index block of the object block group;

the data writing unit is configured for:

writing the identifier of the target object data as an index into a primary index block in the first object block group, writing the identifier of the target object data as an index into a backup index block in the first object block group, updating metadata corresponding to the first data block in the primary metadata block, and backing up the metadata corresponding to the first data block into the backup metadata block.

Optionally, the disk further includes at least one reserved block; the apparatus further includes:

a bad block determining unit, configured for, when updating the index in the primary index block in the first object block group fails, or updating the index backed up in the backup index block in the first object block group fails, or updating the metadata in the primary metadata block fails, or updating the metadata backed up in the backup metadata block fails, determining the object block whose updating operation fails as a suspected bad block, and re-writing and/or re-reading object data into/from the suspected bad block;

a data repairing unit, configured for, if re-writing and/or re-reading the object data succeeds, repairing critical data in the suspected bad block according to primary and backup redundant data; and a data overwriting unit, configured for, if re-writing and/or re-reading the object data fails, obtaining a reserved block and replacing the suspected bad block with the reserved block; overwriting the obtained reserved block according to the primary and backup redundant data, and updating the metadata in the primary metadata block and the metadata backed up in the backup metadata block.

Optionally, the apparatus further includes:

a check value calculating unit, configured for, after the index in the index block in the first object block group, the metadata in the primary metadata block, and the metadata backed up in the backup metadata block are updated according to the identifier of the target object data, calculating a first index check value of the identifier of the target object data;

a check value storage unit, configured for storing the first index check value, the identifier of the first data block, and a first data length of the target object data into a preset index database correspondingly; wherein the preset index database is configured to store a corresponding relationship among an index check value, an identifier of a data block, and a data length.

To achieve the above objective, an embodiment of the present disclosure discloses an electronic device including a processor, a communication interface, a memory, and a communication bus; wherein the processor, the communication interface, and the memory communicate with each other through the communication bus;

the memory is configured to store an application program;

the processor is configured to perform the above method for reading disk data when executing the application program stored in the memory.

To achieve the above objective, an embodiment of the present disclosure discloses an electronic device including a processor, a communication interface, a memory, and a communication bus; wherein the processor, the communication interface, and the memory communicate with each other through the communication bus;

the memory is configured to store an application program;

the processor is configured to perform the above method for writing disk data when executing the application program stored in the memory.

To achieve the above objective, an embodiment of the present disclosure discloses an application program for performing the above method for reading disk data when being executed.

To achieve the above objective, an embodiment of the present disclosure discloses an application program for performing the above method for writing disk data when being executed.

To achieve the above objective, an embodiment of the present disclosure discloses a storage medium for storing an application program, wherein the application program performs the above method for reading disk data when being executed.

To achieve the above objective, an embodiment of the present disclosure discloses a storage medium for storing an application program, wherein the application program performs the above method for writing disk data when being executed.

The embodiments of the present disclosure disclose a method and apparatus for reading or writing disk data. The disk includes a primary metadata block storing metadata, a backup metadata block for backing up metadata, and at least one object block group. Each object block group includes a data block storing object data, and an index block storing an index of the object data. The primary metadata block is located at a head of the disk. The backup metadata block is located at a tail of the disk. The at least one object block group is located between the primary metadata block and the backup metadata block. In this way, in reading or writing object data, the index in the index block, the metadata in the primary metadata block and the metadata backed up in the backup metadata block can be separately operated. The critical data, that is, the index and the primary metadata and backup metadata, is distributed in different areas. Therefore, when object data is written and read, the operations on the critical data are not concentrated in one area, which reduces the probability that the operation frequency of one area is too high, and reduces the probability of accessing index hotspot data, thereby increasing the life and security of the disk.

BRIEF DESCRIPTION OF THE DRAWINGS

In order to illustrate the technical solutions in the embodiments of the present disclosure or the prior art more clearly, the drawings to be used in the description of embodiments or the prior art will be briefly described below. Obviously, the drawings in the following description are only for some embodiments of the application, other drawings may also be obtained based on these drawings by those of ordinary skill in the art without any creative efforts.

DETAILED DESCRIPTION OF THE INVENTION

The technical solutions in the embodiments of the present disclosure are clearly and completely described below with reference to the drawings in the embodiments of the present disclosure. It is obvious that the described embodiments are only a part of the embodiments of the present disclosure, and not all of the embodiments. All other embodiments obtained by a person of ordinary skill in the art based on the embodiments of the present disclosure without any creative efforts fall within the protection scope of the present disclosure.

The present disclosure will be described in detail below through specific embodiments.

Figure 1:
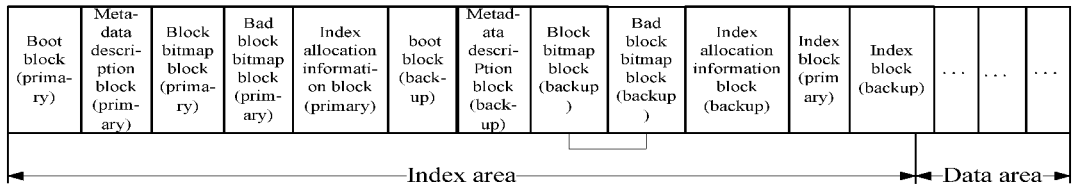
FIG. 1 is a schematic structural diagram of a magnetic disk in the prior art.
Figure 2:
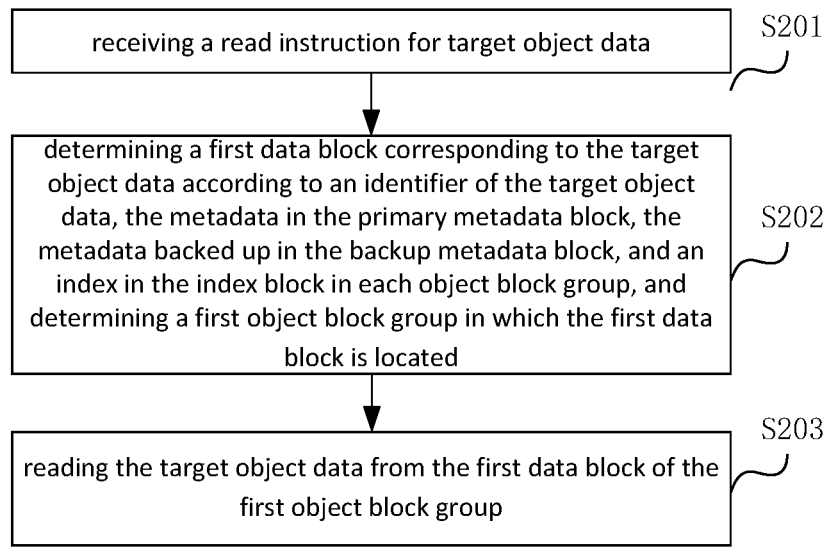
FIG. 2 is a schematic flowchart of method for reading disk data according to an embodiment of the present disclosure.
Figure 3:
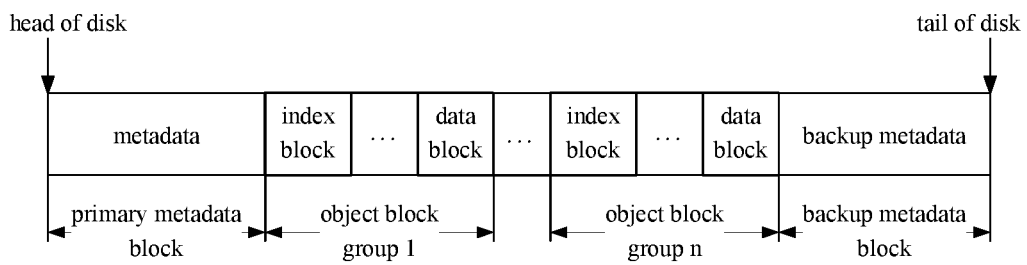
FIG. 3 is a schematic structural diagram of a magnetic disk used in an embodiment of the present disclosure.

Referring to FIG. 2, FIG. 2 is a schematic flowchart of a method for reading disk data according to an embodiment of the present disclosure. As shown in FIG. 3, the disk may include a primary metadata block storing metadata, a backup metadata block for backing up metadata and at least one object block group; each object block group includes a data block storing object data and an index block storing an index of the object data. The primary metadata block is located at a head of the disk, and the backup metadata block is located at a tail of the disk. The at least one object block group is located between the primary metadata block and the backup metadata block. Here, a data block is an object block. The head of the disk is the starting position at which data is read on the disk each time, and the tail of the disk is the last position of the disk opposite to the head of the disk.

Here, the primary metadata and the backup metadata are distributed in different areas. When object data is read and written, the operations on the critical data are not concentrated in one area, which reduces the probability that one area operates in an excessive frequency, and reduces the probability of accessing index hotspot data, thereby increasing the life and security of the disk.

Figure 4:
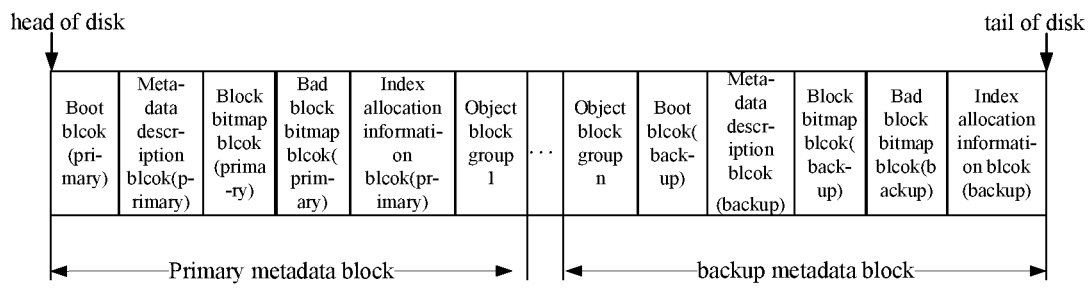
FIG. 4 is another schematic structural diagram of a magnetic disk used in an embodiment of the present disclosure.

Referring to FIG. 4, in general, the primary and backup metadata blocks may include a boot block, a metadata description block, a block bitmap block, a bad block bitmap block, and an index allocation information block.

The boot block is a disk-specific critical block that contains all critical information about whether the disk can be used as a file system to store object data, that is, boot information, similar to a super block of a standard file system. The boot block includes a primary boot block and a backup boot block. The primary boot block is shifted forward (toward the tail of the disk) from 0 at the head of the disk by the size of the boot block. The backup boot block is shifted backward (i.e. toward the head of the disk) from the last position of the disk by the size of the boot block. The contents of the primary and backup boot blocks are the same. The content of the backup boot block is the backup of the content of the primary boot block, and they occupy one object block respectively. The boot block may store description information of the metadata description block, including information such as an identifier of the metadata description block, the size of a storage space occupied by the metadata description block, and the like. The boot block may further include a check value of all description information stored in the boot block, and the check value is used to check whether the information in the boot block is accurate.

It should be noted that the backup boot block may also be located at a specified location as long as the specified location is not adjacent to an area where the primary metadata block is located.

The metadata description block is configured to store description information of a block bitmap block, a bad block bitmap block, an index allocation information block, and the like, that is, an identifier of an object block storing each piece of critical information and the size of a storage space occupied by an object block storing each piece of critical information. The metadata description block may further include a check value of all description information stored by the metadata description block. The check value is used to check whether the information in the metadata description block is accurate. The metadata description block includes a primary data description block and a backup metadata description block. The content of the backup metadata description block is a backup of the content of the primary metadata description block. The critical information includes a block bitmap, a bad block bitmap, index allocation information, and the like.

The block bitmap block is used to store the usage condition of the object block. The disk is divided into object blocks with a fixed size, and all the information in the disk is stored in the object blocks. Each bit in the block bitmap represents the usage condition of an object block, wherein "1" means the object block is used, and "0" means that the object block is not used. The block bitmap block includes a primary block bitmap block and a backup block bitmap block. The content of the backup block bitmap block is the backup of the content of the primary block bitmap block. Here, the object block may be an object block that stores critical data, or an object block that stores object data, i.e. a data block.

The size of a bad block bitmap block is the same as a block bitmap block and corresponds to the block bitmap block one by one. Each bit represents an object block, wherein "1" in the bad block bitmap block indicates that the object block is a bad block, and "0" indicates that the object block is a normal object block. The content of the bad block bitmap block is updated only after a bad block is detected. As long as one sector is damaged in an object block, the object block is marked as a bad block. The bad block bitmap block includes a primary bad block bitmap block and a backup bad block bitmap block. The content of the backup bad block bitmap block is the backup of the content of the primary bad block bitmap block.

The index allocation information block is configured to store information of an object block occupied by an index in each object block group. Each object block group has corresponding description information in the index allocation information block, and the description information describes object blocks occupied by primary and backup indexes. The index allocation information block may further include a check value of all the description information stored by the index allocation information block, where the check value is used to check whether the information in the index allocation information block is accurate. The index allocation information block includes a primary index allocation information block and a backup index allocation information block, and the content of the backup index allocation information block is the backup of the content of the primary index allocation information block.

The above method for reading disk data includes S201-S203.

S201: receiving a read instruction for target object data.

S202: determining a first data block corresponding to the target object data according to an identifier of the target object data, the metadata in the primary metadata block, the metadata backed up in the backup metadata block, and an index in an index block in each object block group, and determining a first object block group in which the first data block is located.

When the metadata in the primary metadata block is complete and accurate, the metadata in the primary metadata block is read, a location of the index block in each object block group is determined according to the read metadata, and the index in the index block is read according to the determined location; when the metadata in the primary metadata block is incomplete and/or inaccurate, the metadata backed up in the backup metadata block is read, a location of the index block in each object block group is determined according to the read metadata, and the index in the index block is read according to the determined location.

Figure 5:
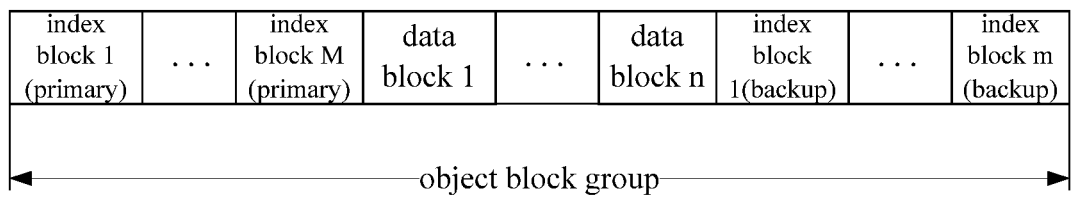
FIG. 5 is a schematic structural diagram of an object block group used in an embodiment of the present disclosure.

In an embodiment of the present disclosure, in order to avoid the problem that data cannot be read due to an index error in an object block group caused by an erroneous operation, as shown in FIG. 5, in each object block group, an index block is divided into a primary index block and a backup index block. The primary index block is used to store an index of the object data, and the backup index block is used to back up the index of the object data, so that when the index error in the primary index block occurs, the index in the primary index block may be restored according to the index in the backup index block. In addition, in order to reduce the probability of accessing index hotspot data, improve the life of the disk and the security of the object data in the disk and facilitate the data storage, for each object block group, the primary index block in the object block group is located at a head of this object block group, a backup index block in the object block group is located at a tail of this object block group, a data block in the object block group is located between the primary index block and the backup index block.

The primary index and the backup index are distributed in different areas. When the object data is read and written, the operations on the index are not concentrated in one area, which reduces the probability that the operation frequency of one area is too high and reduces the probability of accessing index hotspot data, thereby increasing the life and security of the disk.

When the metadata in the primary metadata block at the head of the disk is read successfully, locations of the primary index block and the backup index block in each object group can be determined according to the read metadata in the primary metadata block, for example, the information in the primary index allocation information block, and the index in the primary index block or the index backed up in the backup index block can be read according to the determined locations.

When the metadata in the primary metadata block at the head of the disk fails to be read, the metadata backed up in the backup metadata block at the tail of the disk is read. The locations of the primary index block and the backup index block in each object block group can be determined according to the read metadata backed up in the backup metadata block, for example, the information backed up in the backup allocation information block, and the index in the primary index block or the backup index block can be read according to the determined locations.

The read index may be an index in the primary index block or an index in the backup index block. After the index is read, the first data block corresponding to the target object data is determined according to the read index and the identifier of the target object data, and the first object block group in which the first data block is located is determined.

Here, after the identifier of the target object data is determined, if the read index matches the identifier of the target object data, then it is determined that the data block corresponding to the read index is the first data block corresponding to the target object data.

In addition, the data block included in each object block group of the disk is preset. When the first data block is determined, the first object block group corresponding to the first data block can be determined. For example, the disk includes two object block groups, which are an object block group 1 and an object block group 2 respectively. The object block group 1 includes data blocks 1-8, and the object block group 2 includes data blocks 9-16. If the first data block whose identifier is 4 is determined, then the object block group 1 is determined as the first object block group corresponding to the first data block.

In an embodiment of the present disclosure, the size and composition of the identifier of the target object data are unknown. If the target object data is directly read according to the identifier of the target object data, it will take a long time and use many resources. In order to reduce the time and resources consumed, an index database may be preset. The index database may be used to store a corresponding relationship among an index check value, an identifier of the data block, and a data length. Here, the length of the index check value is smaller than the length of the identifier of the object data. The index check value may be determined according to the metadata in the primary metadata block, the metadata backed up in the backup metadata block, and the index in the index block. For example, the location of the index block can be determined according to the information, stored by the primary index allocation information block or the backup index allocation information block, of the object block occupied by the index. Then the identifier of the object data can be stored in the determined location as an index. Subsequently, the index check value can be calculated according to the index stored at the determined location. The identifier of the data block is the identifier of the object block storing the object data corresponding to the index check value.

In this case, after the read instruction for the target data is received, the S202 may include:

S2021: calculating a first index check value of the identifier of the target object data;

S2022: acquiring an identifier of the first data block and a first data length corresponding to the first index check value from a preset index database;

S2023. determining the first data block according to the identifier of the first data block; and S2024. determining the first object block group according to the first data block.

At this time, the storage location and the data length of the target object data are determined, and thus the target object data can be accurately read. In other words, the object data with the first data length can be read from the first data block of the first object block group.

In an embodiment of the present disclosure, the first index check value may be calculated by using the MD5 and CRC32 algorithms. That is, the first index check value of the identifier of the target object data is calculated by using MD5_CRC32, or by using the HASH algorithm, so as to shorten the length of the identifier of the target object data.

For example, the index check value of the identifier of the object data is calculated by MD5_CRC32. If the identifier of the target object data is Key1, when the target object data is read, an MD5_CRC32 value of Key1 is calculated to be aa. If <aa, 4, 132> is stored in the preset index database, it can be obtained that the identifier of the first data block is 4, and the length of the target object data is 132 Kbytes. The first data block can be determined according to the identifier 4. According to the first data block and preset data blocks included in each object block group, the first object block group corresponding to the first data block can be determined. Then data of 132 Kbytes can be read from the first data block 4 of the first object block group. In other words, the target object data with data length of 132 Kbytes is read.

S203: reading the target object data from the first data block of the first object block group.

In an embodiment of the present disclosure, the step of reading the target object data from the first data block of the first object block group may include: when the information in the index block in the first object block group is read, if it is determined that the read information includes an index matching the identifier of the target object data, determining that the data block corresponding to the index is the first data block, seeking the first data block from the index block of the first object block group, and reading the target object data stored in the first data block.

Here, a physical distance between a data block and an index block in each object block group when the disk includes two or more object block groups is smaller than a physical distance between a data block and an index block when is the disk only includes one object block group. In this way, the seek time of the disk can be effectively shortened, for example, the time to seek the first data block from the index block of the first object block group is shortened. In particular, the more the number of object block groups is, the better the effect of shortening the seek time of the disk is.

In an embodiment of the present disclosure, in order to avoid the problem that a bad block occurs due to long-term use of the disk and the security of the object data in the disk is reduced, the disk may further include at least one reserved block. The reserved block is an object block reserved in the disk, which is not used. After a critical data block of non-boot blocks, that is, a primary or backup metadata block storing critical data of the non-boot information or a primary or backup index block in the object block group is damaged, the reserved object block can replace the damaged data block.

Generally, when the critical data of the non-boot information cannot be read, that is, reading the metadata of the non-boot block information in the primary metadata block fails, or reading the metadata of the non-boot block information backed up in the backup metadata block fails, or reading the index in the primary index block fails, or reading the index backed up in the backup index block fails, the detection and replacement of a bad block is started. The object block whose reading operation fails is determined to be a suspected bad block, and the object data is re-written in the suspected bad block and/or the object data is re-read from the suspected bad block. If the re-writing and/or re-reading of the object data succeeds, the critical data in the suspected bad block is repaired according to the primary and backup redundant data. If the re-writing and/or re-reading of the object data fails, a reserved block is obtained, and the suspected bad block is replaced by the obtained reserved block. The obtained reserved block is overwritten according to the primary and backup redundant data, and the metadata in the primary metadata block and the metadata backed up in the backup metadata block is updated.

For example, a primary index block in an object block group is determined to be a suspected bad block. Object data is re-written to and/or re-read from the suspected bad block. If the re-writing and/or re-reading of the object data succeeds, the data in the suspected bad block can be repaired according to an index in a backup index block of the object block group. If the re-writing and/or re-reading of the object data fails, a reserved block is obtained and the suspected bad block is replaced by the reserved block. The obtained reserved block is overwritten according to the index in the backup index block in the object block group. In addition, the primary index block in the disk has changed, thus the data in the primary index allocation information block in the primary metadata block and the backup index allocation information in the backup metadata block are also updated.

Figure 6:
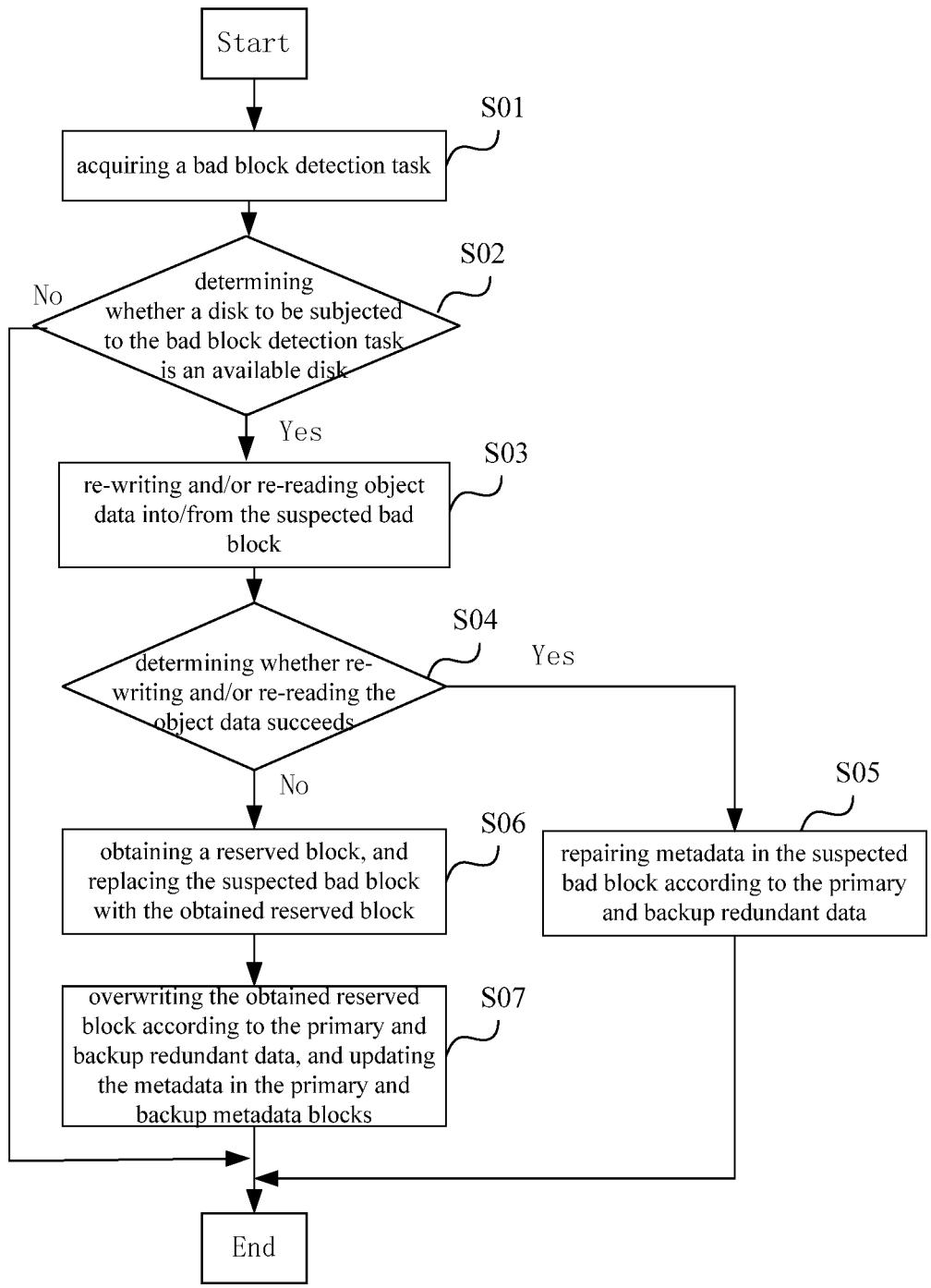
FIG. 6 is a flowchart of a bad block detection according to an embodiment of the present disclosure.

The detection and replacement of a bad block when the critical data of the non-boot information cannot be read will be described below in combination with FIG. 6.

S01: acquiring a bad block detection task.

S02: determining whether a disk to be subjected to the bad block detection task is an available disk; if yes, executing S03; if not, ending the bad block detection task.

S03: re-writing object data into the suspected bad block and/or re-reading object data from the suspected bad block.

S04: determining whether re-writing and/or re-reading the object data succeeds; if yes, executing S05; if not, executing S06.

If the re-writing and/or re-reading of the object data succeeds, the suspected bad block is not a bad block, there is a metadata error in the suspected bad block, and the metadata in the suspected bad block may be repaired according to the primary and backup redundant data. If the re-writing and/or re-reading of the object data fails, a sector in the suspected bad block is damaged, the suspected bad block is a bad block, and the suspected bad block needs to be replaced.

S05: repairing metadata in the suspected bad block according to the primary and backup redundant data.

S06: obtaining a reserved block, and replacing the suspected bad block with the obtained reserved block.

The obtained reserved block is an unused reserved block.

S07: overwriting the obtained reserved block according to the primary and backup redundant data, and updating the metadata in the primary and backup metadata blocks.

Generally, if the index block of the object block group is damaged, the data in the index allocation information block needs to be updated. If the index allocation information block, the bad block bitmap block or the block bitmap block is damaged, the data in the metadata description block needs to be updated. If the metadata description block is damaged, the data in the boot block information needs to be updated.

According to the above embodiment, the disk includes a primary metadata block storing metadata, a backup metadata block for backing up metadata, and at least one object block group. Each object block group includes a data block storing object data, and an index block storing an index of the object data. The primary metadata block is located at a head of the disk. The backup metadata block is located at a tail of the disk. The at least one object block group is located between the primary metadata block and the backup metadata block. In this way, in reading or writing object data, the index in the index block, the metadata in the primary metadata block and the metadata backed up in the backup metadata block can be separately operated. The critical data, that is, the index and the primary metadata and backup metadata, is distributed in different areas. Therefore, when object data is written and read, the operations on the critical data are not concentrated in one area, which reduces the probability that the operation frequency of one area is too high, and reduces the probability of accessing index hotspot data, thereby increasing the life and security of the disk.

Figure 7:
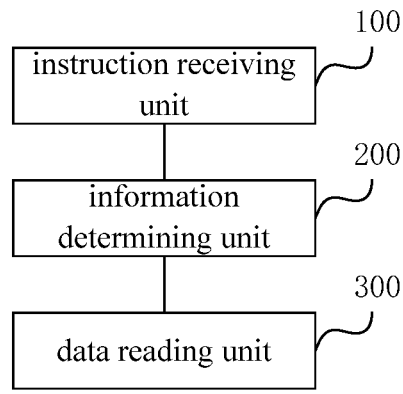
FIG. 7 is a schematic structural diagram of an apparatus for reading disk data according to an embodiment of the present disclosure.

Referring to FIG. 7, FIG. 7 is a schematic structural diagram of an apparatus for reading disk data according to an embodiment of the present disclosure. Corresponding to FIG. 2, the disk includes a primary metadata block storing metadata, a backup metadata block for backing up metadata, and at least one object block group. Each object block group includes a data block storing object data, and an index block storing an index of the object data. The primary metadata block is located at a head of the disk. The backup metadata block is located at a tail of the disk. The at least one object block group is located between the primary metadata block and the backup metadata block. The apparatus includes:

an instruction receiving unit 100, configured for receiving a read instruction for target object data;

an information determining unit 200, configured for determining a first data block corresponding to the target object data according to an identifier of the target object data, the metadata in the primary metadata block, the metadata backed up in the backup metadata block, and an index in the index block in each object block group, and determining a first object block group in which the first data block is located; and a data reading unit 300, configured for reading the target object data from the first data block of the first object block group.

In an embodiment of the present disclosure, the index block includes a primary index block and a backup index block; the primary index block is configured to store an index of object data, and the backup index block is configured to back up the index of the object data.

For each object block group, a primary index block in the object block group is located at a head of the object block group, and a backup index block in the object block group is located at a tail of the object block group; a data block in the object block group is located between the primary index block and the backup index block of the object block group.

In this case, the information determining unit 200 may be specifically configured for: reading the metadata in the primary metadata block and/or the metadata backed up in the backup metadata block, and determining locations of the primary index block and the backup index block in each object block group;

reading the index in the primary index block or the index backed up in the backup index block at the determined locations; and determining the first data block corresponding to the target object data according to the read index and the identifier of the target object data, and determining the first object block group in which the first data block is located.

In an embodiment of the present disclosure, the disk may further include at least one reserved block.

In this case, the apparatus may further include:

a bad block determining unit (not shown in FIG. 7), configured for, when reading the metadata in the primary metadata block fails, or reading the metadata backed up in the backup metadata block fails, or reading the index in the primary index block in each object block group fails, or reading the index backed up in the backup index block in each object block group fails, determining the object block whose reading operation fails as a suspected bad block, and re-writing and/or re-reading object data into/from the suspected bad block;

a data repairing unit (not shown in FIG. 7), configured for, if re-writing and/or re-reading the object data succeeds, repairing data in the suspected bad block according to primary and backup redundant data; and a data overwriting unit (not shown in FIG. 7), configured for, if re-writing and/or re-reading the object data fails, obtaining a reserved block and replacing the suspected bad block with the reserved block; overwriting the obtained reserved block according to the primary and backup redundant data, and updating the metadata in the primary metadata block and the metadata backed up in the backup metadata block.

In an embodiment of the present disclosure, the information determining unit 200 may be specifically configured for:

calculating a first index check value of the identifier of the target object data;

acquiring an identifier of the first data block and a first data length for the first index check value from a preset index database; wherein the preset index database is configured to store a corresponding relationship among an index check value, an identifier of a data block, and a data length; the index check value stored in the preset index database is determined according to the metadata in the primary metadata block, the metadata backed up in the backup metadata block, and the index in the index block in each object block group; and determining the first data block according to the identifier of the first data block, and determining the first object block group in which the first data block is located.

The data reading unit 300 may be specifically configured for:

reading the target object data with the first data length from the first data block of the first object block group.

In the above embodiment, the disk includes a primary metadata block storing metadata, a backup metadata block for backing up metadata, and at least one object block group. Each object block group includes a data block storing object data, and an index block storing an index of the object data. The primary metadata block is located at a head of the disk. The backup metadata block is located at a tail of the disk. The at least one object block group is located between the primary metadata block and the backup metadata block. In this way, in reading or writing object data, the index in the index block, the metadata in the primary metadata block and the metadata backed up in the backup metadata block can be separately operated. The critical data, that is, the index and the primary metadata and backup metadata, is distributed in different areas. Therefore, when object data is written and read, the operations on the critical data are not concentrated in one area, which reduces the probability that the operation frequency of one area is too high, and reduces the probability of accessing index hotspot data, thereby increasing the life and security of the disk.

Figure 8:
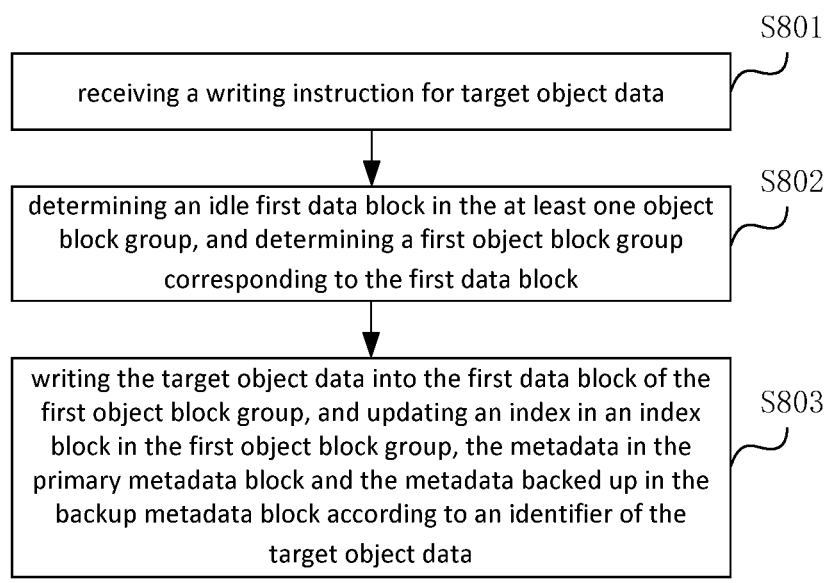
FIG. 8 is a schematic flowchart of a method for writing disk data according to an embodiment of the present disclosure.

Referring to FIG. 8, FIG. 8 is a schematic flowchart of a method for writing disk data according to an embodiment of the present disclosure. As shown in FIG. 3, the disk may include: a primary metadata block storing metadata, a backup metadata block for backing up the metadata, and at least one object block group. Each object block group includes: a data block storing object data, and an index block storing an index of the object data. The primary metadata block is located at a head of the disk. The backup metadata block is located at a tail of the disk. The at least one object block group is located between the primary metadata block and the backup metadata block. Here, a data block can be understood as an object block.

In this case, the above method for writing disk data includes S801-S803.

S801: receiving a write instruction for target object data.

S802: determining an idle first data block in the at least one object block group, and determining a first object block group corresponding to the first data block.

Generally, the idle first data block is determined according to the stored primary and backup metadata, such as a block bitmap. For example, an object block whose usage condition is marked as "0" in a block bitmap is determined as the idle first data block.

In order to ensure that the writing of target data succeeds, after the idle first data block is determined, it may be determined whether the first data block is marked as a bad block by a bad block bitmap block. If not, a first object block group corresponding to the first data block continues to be determined. If yes, the idle first data block is re-determined.

In an embodiment of the present disclosure, a data block included in each object block group of the disk is preset. When the first data block is determined, the first object block group corresponding to the first data block can be determined. For example, the disk includes two object block groups, which are an object block group 1 and an object block group 2 respectively. The object block group 1 includes data blocks 1-8, and the object block group 2 includes data blocks 9-16. If the identifier of the first data block is determined to be 4, then the object block group 1 is determined as the first object block group corresponding to the first data block.

S803: writing the target object data into the first data block of the first object block group, and updating an index in the index block in the first object block group, the metadata in the primary metadata block and the metadata backed up in the backup metadata block according to an identifier of the target object data.

In an embodiment of the present disclosure, in order to avoid the problem that data cannot be read due to an index error in an object block group caused by an erroneous operation, as shown in FIG. 5, in each object block group, an index block is divided into a primary index block and a backup index block. The primary index block is used to store an index of the object data, and the backup index block is used to back up the index of the object data, so that when the index error in the primary index block occurs, the index in the primary index block may be restored according to the index in the backup index block. In addition, in order to reduce the probability of accessing index hotspot data, improve the life of the disk and the security of the object data in the disk and facilitate the data storage, for each object block group, a primary index block in the object block group is located at a head of this object block group, and a backup index block in the object block group is located at a tail of this object block group. A data block in the object block group is located between the primary index block and the backup index block.

In this case, S803 may include: writing the target object data into the first data block of the first object block group, writing the identifier of the target object data as an index into the primary index block in the first object block group, writing the identifier of the target object data as an index into the backup index block in the first object block group, and updating the metadata corresponding to the first data block in the primary metadata block, and backing up the metadata corresponding to the first data block in the backup metadata block. For example, after the target object data is written into the first data block of the first object block group, the identifier of the target object data is used as an index and is written into the primary index block and the backup index block in the first object block group, and the block bitmaps in the block bitmap blocks in the primary and backup metadata blocks are updated. That is, the usage condition of the first data block in the block bitmap is marked as "1", so that an idle data block can be quickly acquired when object data is written next time.

In an embodiment of the present disclosure, in order to avoid the problem that a bad block occurs due to long-term use of the disk and the security of the object data in the disk is reduced, the disk may further include at least one reserved block. The reserved block is an object block reserved in the disk, which is not used. After a critical data block of the non-boot blocks, that is, the primary or backup metadata block storing the critical data of the non-boot information or the primary or backup index block in the object block group is damaged, the critical data block is replaced by the reserved block.

Generally, when the critical data of the non-boot information cannot be read, that is, updating the index in the primary index block in the first object block group fails, or updating the index backed up in the backup index block in the first object block group fails, or updating the metadata of the non-boot information in the primary metadata block fails, or updating the metadata of the non-boot information backed up in the backup metadata block fails, the detection and replacement of a bad block is started. The object block whose updating operation fails is determined to be a suspected bad block, and the object data is re-written in the suspected bad block and/or the object data is re-read from the suspected bad block. If the re-writing and/or re-reading of the object data succeeds, the critical data in the suspected bad block is repaired according to the primary and backup redundant data. If the re-writing and/or re-reading of the object data fails, a reserved block is obtained, and the suspected bad block is replaced by the obtained reserved block. The obtained reserved block is overwritten according to the primary and backup redundant data, and the metadata in the primary metadata block and the metadata backed up in the backup metadata block are updated. Reference can be made to FIG. 6 for the detection and replacement of the bad block when the critical data of the non-boot information cannot be updated.

Figure 9:
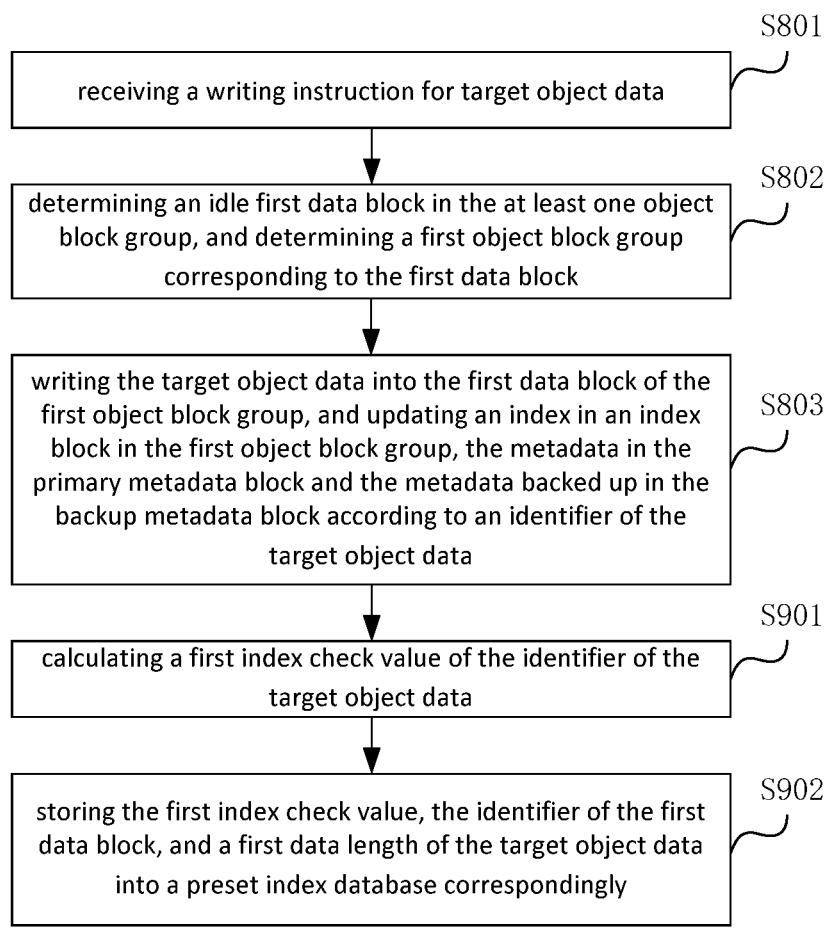
FIG. 9 is another schematic flowchart of a method for writing disk data according to an embodiment of the present disclosure.

In an embodiment of the present disclosure, the size and composition of the identifier of the target object data are unknown. If a data block in which the identifier of the target object data is located is directly determined from the index stored in the index block according to the identifier of the target object data, it will take a long time and use many resources. In order to reduce the time and resources consumed in reading the object data, an index database may be preset. The index database may be used to store a corresponding relationship among an index check value, an identifier of the data block, and a data length. Here, the length of the index check value is smaller than the length of the identifier of the object data. The index check value may be determined according to the metadata in the primary metadata block, the metadata backed up in the backup metadata block, and the index in the index block. The identifier in the data block is the identifier of the object block storing the object data corresponding to the index check value. In this case, referring to FIG. 9, on the basis of FIG. 8, after updating the index in the index block in the first object block group, the metadata in the primary metadata block and the metadata backed up in the backup metadata block according to an identifier of the target object data, the above method for writing disk data may further include S901-S902.

S901: calculating a first index check value of the identifier of the target object data.

Here, the purpose of calculating the first index check value is to shorten the length of the identifier of the target object data. In an embodiment of the present disclosure, the first index check value may be calculated by using the MD5 and CRC32 algorithms. In other words, the first index check value of the identifier of the target object data is calculated by using the MD5_CRC32, or by using the HASH algorithm.

For example, the first index check value of the identifier of the target object data is calculated by using the MD5 and CRC32 values. The target object data for the write instruction is <Key1, Value1>. The length of the target object data is 132 Kbytes. The identifier of the target object data is Key1. In addition, the identifier of the first data block is 4. After the Value1 is written into the first data block of the first object block group, and the index in the index block in the first object block group, the metadata in the primary metadata block and the metadata backed up in the backup metadata block are updated according to the identifier of the target object data, the MD5_CRC32 value of Key1 is calculated. If the value is aa, then <aa, 4, 132> is stored to the preset index database, so that when the target object data <Key1, Value1> is read, it can be quickly obtained that the identifier of the first data block is 4, and the data length of the target object data is 132 Kbytes.

S902: storing the first index check value, the identifier of the first data block, and a first data length of the target object data into a preset index database correspondingly.

Figure 10:
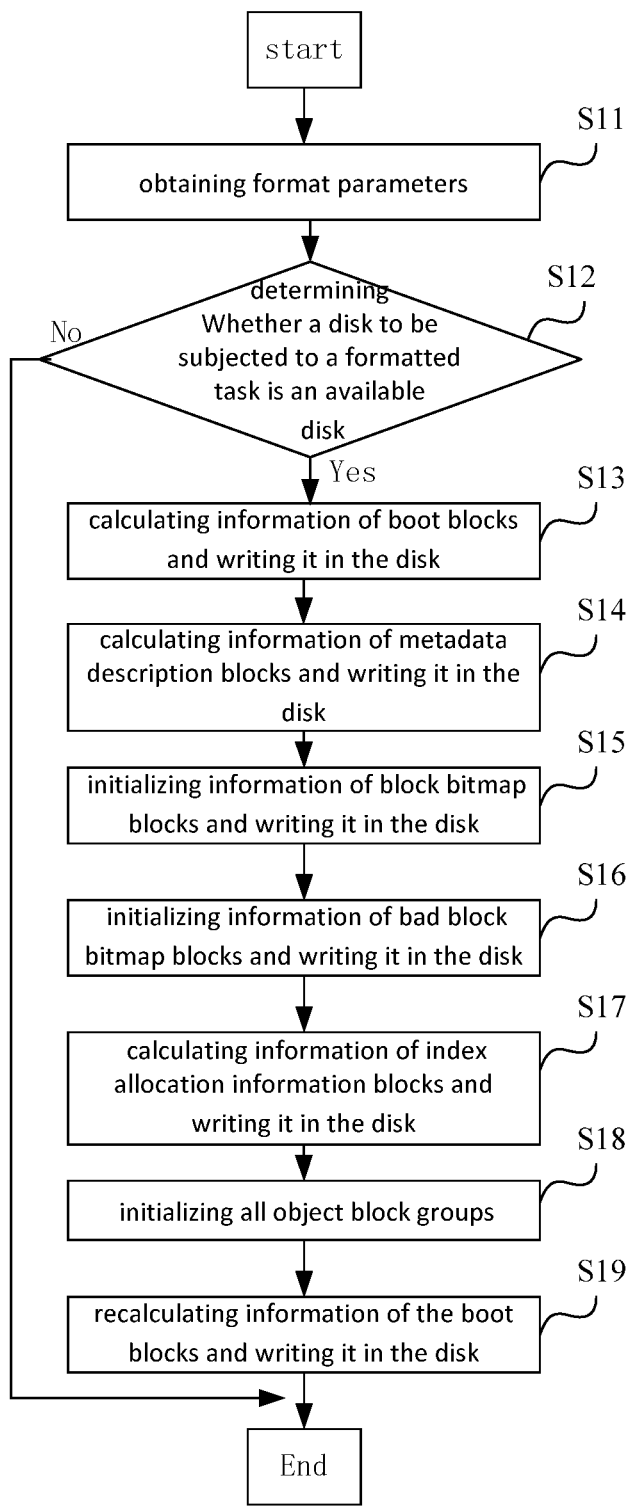
FIG. 10 is a schematic flowchart of a disk formatting according to an embodiment of the present disclosure.

In an embodiment of the present disclosure, in order to facilitate the writing of the object data, the disk may be formatted before the writing of the data into the disk. Referring to FIG. 10, the formatting process may include S11-S19.

S11: obtaining format parameters.

Here, the format parameters may include the size of a single object block, the number of the index blocks in an object block group, the size of a single index, the size of a reserved block, and the like.

In addition, in order to facilitate determination of the target block group to which the target block belongs, the disk may be divided into N object blocks according to the size of the single object block, and the N object blocks are numbered from 0.

S12: determining whether a disk to be subjected to a formatted task is an available disk; if yes, executing S13; if not, ending the formatting of the disk.

S13: calculating information of boot blocks and writing it in the disk.

Here, calculating information of boot blocks and writing it in the disk may include: acquiring the size of the disk, calculating the size of object block groups, calculating description information of metadata description blocks, and filling tag information of starting the formatting.

In an embodiment of the present disclosure, the calculation of the size of the object block groups may include as follows.

For example, the number of primary index blocks of each object block group is M (in a unit of the number of object blocks), the size of a single index is S (in a unit of KB), and the number of reserved blocks is R (in a unit of the number of object blocks), the size of a single object block is B (in a unit of KB), and the total size of the disk is T (in a unit of KB).

The number Object_Index_Num of data blocks that can be indexed by each index block:

Object_Index_Num=$B/S$

The number Group_Total_Object of object blocks contained in each object block group is:

Group_Total_Object=Object_Index_Num*$M$+2*$M$

The number Group Num of object block groups contained in the disk of the size T is:
the number of complete object block groups:

G=(($T/B$)-5*2-$R$)/Group_Total_Object;

wherein, 5*2 indicates the number of object blocks occupied by the primary and backup metadata blocks;
the number of object blocks contained in the last object block group is:

LAST=($T/B$)-5*2-$R$-$G$*Group_Total_Object;

if the number of object blocks in the last object block group is larger than the space required for the primary and backup indexes, i.e. LAST>2*M, then the object block group which is not complete is retained; otherwise, that space is not used; that is, $$\text{Group\_Num} = \begin{cases} G, & \text{LAST} \leq 2*M \\ G+1, & \text{Others} \end{cases}.$$

S14: calculating information of metadata description blocks and writing it in the disk.

S15: initializing information of block bitmap blocks and writing it in the disk.

If no object data is stored in the disk, then the usage conditions of the object blocks are all marked as "0" in the block bitmap block.

S16: initializing information of bad block bitmap blocks and writing it in the disk.

S17: calculating information of index allocation information blocks and writing it in the disk.

S18: initializing all object block groups.

In initializing each object block group, the information of the primary and backup index blocks needs to be initialized, which includes: clearing the index blocks and writing the check value into them to prevent data errors.

S19: recalculating information of the boot blocks and writing it in the disk.

Here, recalculating the information of the boot blocks may include filling tag information indicating that the formatting is completed.

In embodiments of the present disclosure, the disk includes a primary metadata block storing metadata, a backup metadata block for backing up metadata, and at least one object block group. Each object block group includes a data block storing object data, and an index block storing an index of the object data. The primary metadata block is located at a head of the disk. The backup metadata block is located at a tail of the disk. The at least one object block group is located between the primary metadata block and the backup metadata block. In this way, when object data in read and written, the index in the index block, the metadata in the primary metadata block and the metadata backed up in the backup metadata block can be separately operated. The critical data, that is, the index and the primary metadata and backup metadata, are distributed in different areas. When object data is read and written, the operations on the critical data are not concentrated in one area, which reduces the probability that the operation frequency of one area is too high, and reduces the probability of accessing index hotspot data, thereby increasing the life and security of the disk.

Figure 11:
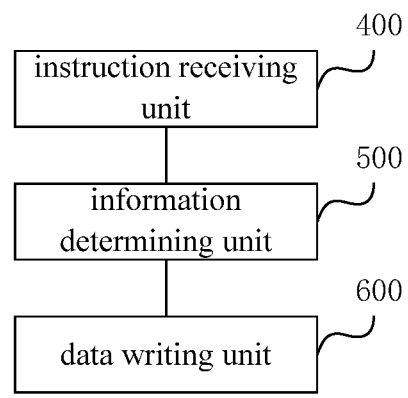
FIG. 11 is a schematic structural diagram of an apparatus for writing disk data according to an embodiment of the present disclosure.

Referring to FIG. 11, FIG. 11 is a schematic structural diagram of an apparatus for writing disk data according to an embodiment of the present disclosure. Corresponding to FIG. 8, the disk includes a primary metadata block storing metadata, a backup metadata block for backing up metadata, and at least one object block group. Each object block group includes a data block storing object data, and an index block storing an index of the object data. The primary metadata block is located at a head of the disk. The backup metadata block is located at a tail of the disk. The at least one object block group is located between the primary metadata block and the backup metadata block. The apparatus includes:

an instruction receiving unit 400, configured for receiving a writing instruction for target object data;

an information determining unit 500, configured for determining an idle first data block in the at least one object block group, and determining a first object block group corresponding to the first data block; and a data writing unit 600, configured for writing the target object data into the first data block of the first object block group, and updating an index in an index block in the first object block group, the metadata in the primary metadata block and the metadata backed up in the backup metadata block according to an identifier of the target object data.

In an embodiment of the present disclosure, the index block may include the index block includes a primary index block and a backup index block; the primary index block is configured to store an index of object data, and the backup index block is configured to back up the index of the object data.

For each object block group, a primary index block in the object block group is located at a head of the object block group, and a backup index block in the object block group is located at a tail of the object block group; a data block in the object block group is located between the primary index block and the backup index block of the object block group.

In this case, the data writing unit 600 may be specifically configured for:

writing the identifier of the target object data as an index into a primary index block in the first object block group, writing the identifier of the target object data as an index into a backup index block in the first object block group, updating metadata corresponding to the first data block in the primary metadata block, and backing up the metadata corresponding to the first data block into the backup metadata block.

In an embodiment of the present disclosure, the disk may further include at least one reserved block; the apparatus may further include:

a bad block determining unit (not shown in FIG. 11), configured for, when updating the index in the primary index block in the first object block group fails, or updating the index backed up in the backup index block in the first object block group fails, or updating the metadata in the primary metadata block fails, or updating the metadata backed up in the backup metadata block fails, determining the object block whose updating operation fails as a suspected bad block, and re-writing and/or re-reading object data into/from the suspected bad block;

a data repairing unit (not shown in FIG. 11), configured for, if re-writing and/or re-reading the object data succeeds, repairing critical data in the suspected bad block according to primary and backup redundant data; and a data overwriting unit (not shown in FIG. 11), configured for, if re-writing and/or re-reading the object data fails, obtaining a reserved block and replacing the suspected bad block with the reserved block; overwriting the obtained reserved block according to the primary and backup redundant data, and updating the metadata in the primary metadata block and the metadata backed up in the backup metadata block.

Figure 12:
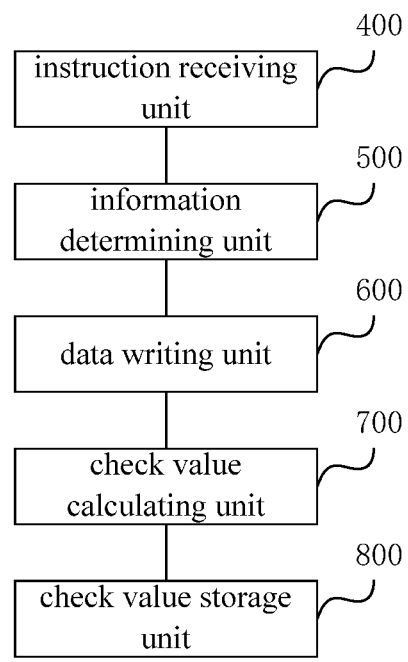
FIG. 12 is another schematic structural diagram of an apparatus for writing disk data according to an embodiment of the present disclosure.

In an embodiment of the present disclosure, referring to FIG. 12, on the basis of FIG. 11, the apparatus may further include:

a check value calculating unit 700, configured for, after the index in the index block in the first object block group, the metadata in the primary metadata block, and the metadata backed up in the backup metadata block are updated according to the identifier of the target object data, calculating a first index check value of the identifier of the target object data;

a check value storage unit 800, configured for storing the first index check value, the identifier of the first data block, and a first data length of the target object data into a preset index database correspondingly; wherein the preset index database is configured to store a corresponding relationship among an index check value, an identifier of a data block, and a data length.

In the above embodiment, the disk includes a primary metadata block storing metadata, a backup metadata block for backing up metadata, and at least one object block group. Each object block group includes a data block storing object data, and an index block storing an index of the object data. The primary metadata block is located at a head of the disk. The backup metadata block is located at a tail of the disk. The at least one object block group is located between the primary metadata block and the backup metadata block. In this way, when object data in read and written, the index in the index block, the metadata in the primary metadata block and the metadata backed up in the backup metadata block can be separately operated. The critical data, that is, the index and the primary metadata and backup metadata, are distributed in different areas. When object data is read and written, the operations on the critical data are not concentrated in one area, which reduces the probability that the operation frequency of one area is too high, and reduces the probability of accessing index hotspot data, thereby increasing the life and security of the disk.

An embodiment of the present disclosure also provides an electronic device including a processor, a communication interface, a memory, and a communication bus. The processor, the communication interface, and the memory communicate with each other through the communication bus.

The memory is configured to store an application program.

The processor is configured to perform the above method for reading disk data when executing the application stored in the memory. In the method for reading disk data, the disk includes a primary metadata block storing metadata, a backup metadata block for backing up metadata, and at least one object block group. Each object block group includes a data block storing object data, and an index block storing an index of the object data. The primary metadata block is located at a head of the disk, and the backup metadata block is located at a tail of the disk. The at least one object block group is located between the primary metadata block and the backup metadata block. The method includes:

receiving a read instruction for target object data;

determining a first data block corresponding to the target object data according to an identifier of the target object data, the metadata in the primary metadata block, the metadata backed up in the backup metadata block, and an index in the index block in each object block group, and determining a first object block group in which the first data block is located; and reading the target object data from the first data block of the first object block group.

Optionally, the index block includes a primary index block and a backup index block; the primary index block is configured to store an index of object data, and the backup index block is configured to back up the index of the object data.

For each object block group, a primary index block in the object block group is located at a head of the object block group, and a backup index block in the object block group is located at a tail of the object block group; a data block in the object block group is located between the primary index block and the backup index block of the object block group.

The step of determining a first data block corresponding to the target object data according to an identifier of the target object data, the metadata in the primary metadata block, the metadata backed up in the backup metadata block, and an index in the index block in each object block group, and determining a first object block group in which the first data block is located includes:

reading the metadata in the primary metadata block and/or the metadata backed up in the backup metadata block, and determining locations of the primary index block and the backup index block in each object block group;

reading the index in the primary index block or the index backed up in the backup index block at the determined locations; and determining the first data block corresponding to the target object data according to the read index and the identifier of the target object data, and determining the first object block group in which the first data block is located.

Optionally, the disk further includes at least one reserved block; and the method further includes:

when reading the metadata in the primary metadata block fails, or reading the metadata backed up in the backup metadata block fails, or reading the index in the primary index block in each object block group fails, or reading the index backed up in the backup index block in each object block group fails, determining the object block whose reading operation fails as a suspected bad block, and re-writing and/or re-reading object data into/from the suspected bad block;

if re-writing and/or re-reading the object data succeeds, repairing data in the suspected bad block according to primary and backup redundant data; and if re-writing and/or re-reading the object data fails, obtaining a reserved block and replacing the suspected bad block with the reserved block; overwriting the obtained reserved block according to the primary and backup redundant data, and updating the metadata in the primary metadata block and the metadata backed up in the backup metadata block.

Optionally, the step of determining a data block corresponding to the target object data according to an identifier of the target object data, the metadata in the primary metadata block, the metadata backed up in the backup metadata block, and an index in the index block in each object block group includes:

calculating a first index check value of the identifier of the target object data;

acquiring an identifier of the first data block and a first data length for the first index check value from a preset index database; wherein the preset index database is configured to store a corresponding relationship among an index check value, an identifier of a data block, and a data length; the index check value stored in the preset index database is determined according to the metadata in the primary metadata block, the metadata backed up in the backup metadata block, and the index in the index block in each object block group; and determining the first data block according to the identifier of the first data block;

the step of reading the target object data from the first data block of the first object block group includes:

reading the target object data with the first data length from the first data block of the first object block group.

In the above embodiment, the disk includes a primary metadata block storing metadata, a backup metadata block for backing up metadata, and at least one object block group. Each object block group includes a data block storing object data, and an index block storing an index of the object data. The primary metadata block is located at a head of the disk. The backup metadata block is located at a tail of the disk. The at least one object block group is located between the primary metadata block and the backup metadata block. In this way, when object data in read and written, the index in the index block, the metadata in the primary metadata block and the metadata backed up in the backup metadata block can be separately operated. The critical data, that is, the index and the primary metadata and backup metadata, are distributed in different areas. When object data is read and written, the operations on the critical data are not concentrated in one area, which reduces the probability that the operation frequency of one area is too high, and reduces the probability of accessing index hotspot data, thereby increasing the life and security of the disk.

The communication bus may be a PCI (Peripheral Component Interconnect) bus or an EISA (Extended Industry Standard Architecture) bus. The communication bus can be divided into an address bus, a data bus, a control bus, and the like.

The communication interface is used for communication between the above storage server and other devices.

The memory may include a RAM (Random Access Memory), and may also include NVM (Non-Volatile Memory), such as at least one disk storage. Optionally, the memory may also be at least one storage device located away from the aforementioned processor.

The processor may be a general-purpose processor, including a CPU (Central Processing Unit), an NP (Network Processor), or the like; or a DSP (Digital Signal Processing) or an ASIC (Application) Specific Integrated Circuit, FPGA (Field-Programmable Gate Array) or other programmable logic device, discrete gate or transistor logic device, discrete hardware components.

An embodiment of the present disclosure also provides an electronic device including a processor, a communication interface, a memory, and a communication bus; wherein the processor, the communication interface, and the memory communicate with each other through the communication bus.

The memory is configured to store an application program.

The processor is configured to implement the above method for writing disk data when executing the application stored in the memory. In the method for writing disk data, the disk includes: a primary metadata block storing metadata, a backup metadata block for backing up metadata, and at least one object block group. Each object block group includes: a data block storing object data, and an index block storing an index of the object data. The primary metadata block is located at a head of the disk; and the backup metadata block is located at a tail of the disk. The at least one object block group is located between the primary metadata block and the backup metadata block. The method includes:

receiving a writing instruction for target object data;

determining an idle first data block in the at least one object block group, and determining a first object block group corresponding to the first data block; and writing the target object data into the first data block of the first object block group, and updating an index in an index block in the first object block group, the metadata in the primary metadata block and the metadata backed up in the backup metadata block according to an identifier of the target object data.

Optionally, the index block includes a primary index block and a backup index block; the primary index block is configured to store an index of object data, and the backup index block is configured to back up the index of the object data;

for each object block group, a primary index block in the object block group is located at a head of the object block group, and a backup index block in the object block group is located at a tail of the object block group; a data block in the object block group is located between the primary index block and the backup index block of the object block group;

the step of updating an index in an index block in the first object block group, the metadata in the primary metadata block and the metadata backed up in the backup metadata block according to an identifier of the target object data includes:

writing the identifier of the target object data as an index into a primary index block in the first object block group, writing the identifier of the target object data as an index into a backup index block in the first object block group, updating metadata corresponding to the first data block in the primary metadata block, and backing up the metadata corresponding to the first data block into the backup metadata block.

Optionally, the disk further includes at least one reserved block; the method further includes:

when updating the index in the primary index block in the first object block group fails, or updating the index backed up in the backup index block in the first object block group fails, or updating the metadata in the primary metadata block fails, or updating the metadata backed up in the backup metadata block fails, determining the object block whose updating operation fails as a suspected bad block, and re-writing and/or re-reading object data into/from the suspected bad block;

if re-writing and/or re-reading the object data succeeds, repairing critical data in the suspected bad block according to primary and backup redundant data; and if re-writing and/or re-reading the object data fails, obtaining a reserved block and replacing the suspected bad block with the reserved block; overwriting the obtained reserved block according to the primary and backup redundant data, and updating the metadata in the primary metadata block and the metadata backed up in the backup metadata block.

Optionally, after updating an index in an index block in the first object block group, the metadata in the primary metadata block and the metadata backed up in the backup metadata block according to an identifier of the target object data, the method further includes:

calculating a first index check value of the identifier of the target object data; and storing the first index check value, the identifier of the first data block, and a first data length of the target object data into a preset index database correspondingly; wherein the preset index database is configured to store a corresponding relationship among an index check value, an identifier of a data block, and a data length.

In the above embodiment, the disk includes a primary metadata block storing metadata, a backup metadata block for backing up metadata, and at least one object block group. Each object block group includes a data block storing object data, and an index block storing an index of the object data. The primary metadata block is located at a head of the disk. The backup metadata block is located at a tail of the disk. The at least one object block group is located between the primary metadata block and the backup metadata block. In this way, when object data in read and written, the index in the index block, the metadata in the primary metadata block and the metadata backed up in the backup metadata block can be separately operated. The critical data, that is, the index and the primary metadata and backup metadata, are distributed in different areas. When object data is read and written, the operations on the critical data are not concentrated in one area, which reduces the probability that the operation frequency of one area is too high, and reduces the probability of accessing index hotspot data, thereby increasing the life and security of the disk.

The communication bus may be a PCI bus or an EISA bus. The communication bus can be divided into an address bus, a data bus, a control bus, and the like.

The communication interface is used for communication between the above storage server and other devices.

The memory may include a RAM, and may also include NVM, such as at least one disk storage. Optionally, the memory may also be at least one storage device located away from the aforementioned processor.

The processor may be a general-purpose processor, including a CPU, an NP, or the like; or a DSP or an ASIC, an FPGA or other programmable logic devices, discrete gates or transistor logic devices, discrete hardware components.

An embodiment of the present disclosure also provides an application program for implementing the above method for reading disk data when being executed. In the method for reading disk data, the disk includes a primary metadata block storing metadata, a backup metadata block for backing up metadata, and at least one object block group. Each object block group includes a data block storing object data, an index block storing an index of the object data. The primary metadata block is located at a head of the disk; and the backup metadata block is located at a tail of the disk. The at least one object block group is located between the primary metadata block and the backup metadata block. The method includes:

receiving a read instruction for target object data;

determining a first data block corresponding to the target object data according to an identifier of the target object data, the metadata in the primary metadata block, the metadata backed up in the backup metadata block, and an index in the index block in each object block group, and determining a first object block group in which the first data block is located; and reading the target object data from the first data block of the first object block group.

Optionally, the index block includes a primary index block and a backup index block; the primary index block is configured to store an index of object data, and the backup index block is configured to back up the index of the object data;

for each object block group, a primary index block in the object block group is located at a head of the object block group, and a backup index block in the object block group is located at a tail of the object block group; a data block in the object block group is located between the primary index block and the backup index block of the object block group;

the step of determining a first data block corresponding to the target object data according to an identifier of the target object data, the metadata in the primary metadata block, the metadata backed up in the backup metadata block, and an index in the index block in each object block group, and determining a first object block group in which the first data block is located includes:

reading the metadata in the primary metadata block and/or the metadata backed up in the backup metadata block, and determining locations of the primary index block and the backup index block in each object block group;

reading the index in the primary index block or the index backed up in the backup index block at the determined locations; and determining the first data block corresponding to the target object data according to the read index and the identifier of the target object data, and determining the first object block group in which the first data block is located.

Optionally, the disk further includes at least one reserved block; and the method further includes:

when reading the metadata in the primary metadata block fails, or reading the metadata backed up in the backup metadata block fails, or reading the index in the primary index block in each object block group fails, or reading the index backed up in the backup index block in each object block group fails, determining the object block whose reading operation fails as a suspected bad block, and re-writing and/or re-reading object data into/from the suspected bad block;

if re-writing and/or re-reading the object data succeeds, repairing data in the suspected bad block according to primary and backup redundant data;

if re-writing and/or re-reading the object data fails, obtaining a reserved block and replacing the suspected bad block with the reserved block; overwriting the obtained reserved block according to the primary and backup redundant data, and updating the metadata in the primary metadata block and the metadata backed up in the backup metadata block.

Optionally, the step of determining a data block corresponding to the target object data according to an identifier of the target object data, the metadata in the primary metadata block, the metadata backed up in the backup metadata block, and an index in the index block in each object block group includes:

calculating a first index check value of the identifier of the target object data;

acquiring an identifier of the first data block and a first data length for the first index check value from a preset index database; wherein the preset index database is configured to store a corresponding relationship among an index check value, an identifier of a data block, and a data length; the index check value stored in the preset index database is determined according to the metadata in the primary metadata block, the metadata backed up in the backup metadata block, and the index in the index block in each object block group; and determining the first data block according to the identifier of the first data block;

the step of reading the target object data from the first data block of the first object block group includes:

reading the target object data with the first data length from the first data block of the first object block group.

In the above embodiment, the disk includes a primary metadata block storing metadata, a backup metadata block for backing up metadata, and at least one object block group. Each object block group includes a data block storing object data, and an index block storing an index of the object data. The primary metadata block is located at a head of the disk. The backup metadata block is located at a tail of the disk. The at least one object block group is located between the primary metadata block and the backup metadata block. In this way, when object data in read and written, the index in the index block, the metadata in the primary metadata block and the metadata backed up in the backup metadata block can be separately operated. The critical data, that is, the index and the primary metadata and backup metadata, are distributed in different areas. When object data is read and written, the operations on the critical data are not concentrated in one area, which reduces the probability that the operation frequency of one area is too high, and reduces the probability of accessing index hotspot data, thereby increasing the life and security of the disk.

To achieve the above objective, an embodiment of the present disclosure discloses an application program for implementing the above method for writing disk data when being executed. In the method for writing disk data, the disk includes: a primary metadata block storing metadata, a backup metadata block for backing up metadata, and at least one object block group. Each object block group includes: a data block storing object data, an index block storing an index of the object data. The primary metadata block is located at a head of the disk; and the backup metadata block is located at a tail of the disk. The at least one object block group is located between the primary metadata block and the backup metadata block. The method includes:

receiving a writing instruction for target object data;

determining an idle first data block in the at least one object block group, and determining a first object block group corresponding to the first data block; and writing the target object data into the first data block of the first object block group, and updating an index in an index block in the first object block group, the metadata in the primary metadata block and the metadata backed up in the backup metadata block according to an identifier of the target object data.

Optionally, the index block includes a primary index block and a backup index block; the primary index block is configured to store an index of object data, and the backup index block is configured to back up the index of the object data;

for each object block group, a primary index block in the object block group is located at a head of the object block group, and a backup index block in the object block group is located at a tail of the object block group; a data block in the object block group is located between the primary index block and the backup index block of the object block group;

the step of updating an index in an index block in the first object block group, the metadata in the primary metadata block and the metadata backed up in the backup metadata block according to an identifier of the target object data includes:

writing the identifier of the target object data as an index into a primary index block in the first object block group, writing the identifier of the target object data as an index into a backup index block in the first object block group, updating metadata corresponding to the first data block in the primary metadata block, and backing up the metadata corresponding to the first data block into the backup metadata block.

Optionally, the disk further includes at least one reserved block; the method further includes:

when updating the index in the primary index block in the first object block group fails, or updating the index backed up in the backup index block in the first object block group fails, or updating the metadata in the primary metadata block fails, or updating the metadata backed up in the backup metadata block fails, determining the object block whose updating operation fails as a suspected bad block, and re-writing and/or re-reading object data into/from the suspected bad block;

if re-writing and/or re-reading the object data succeeds, repairing critical data in the suspected bad block according to primary and backup redundant data;

if re-writing and/or re-reading the object data fails, obtaining a reserved block and replacing the suspected bad block with the reserved block; overwriting the obtained reserved block according to the primary and backup redundant data, and updating the metadata in the primary metadata block and the metadata backed up in the backup metadata block.

Optionally, after updating an index in an index block in the first object block group, the metadata in the primary metadata block and the metadata backed up in the backup metadata block according to an identifier of the target object data, the method further includes:

calculating a first index check value of the identifier of the target object data; and storing the first index check value, the identifier of the first data block, and a first data length of the target object data into a preset index database correspondingly; wherein the preset index database is configured to store a corresponding relationship among an index check value, an identifier of a data block, and a data length.

In the above embodiment, the disk includes a primary metadata block storing metadata, a backup metadata block for backing up metadata, and at least one object block group. Each object block group includes a data block storing object data, and an index block storing an index of the object data. The primary metadata block is located at a head of the disk. The backup metadata block is located at a tail of the disk. The at least one object block group is located between the primary metadata block and the backup metadata block. In this way, when object data in read and written, the index in the index block, the metadata in the primary metadata block and the metadata backed up in the backup metadata block can be separately operated. The critical data, that is, the index and the primary metadata and backup metadata, are distributed in different areas. When object data is read and written, the operations on the critical data are not concentrated in one area, which reduces the probability that the operation frequency of one area is too high, and reduces the probability of accessing index hotspot data, thereby increasing the life and security of the disk.

An embodiment of the present disclosure discloses a storage medium for storing an application program, and the application program performs above method for reading disk data when being executed. In the method for reading disk data, the disk includes a primary metadata block storing metadata, a backup metadata block for backing up metadata, and at least one object block group. Each object block group includes a data block storing object data, and an index block storing an index of the object data. The primary metadata block is located at a head of the disk; and the backup metadata block is located at a tail of the disk. The at least one object block group is located between the primary metadata block and the backup metadata block. The method includes:

receiving a read instruction for target object data;

determining a first data block corresponding to the target object data according to an identifier of the target object data, the metadata in the primary metadata block, the metadata backed up in the backup metadata block, and an index in the index block in each object block group, and determining a first object block group in which the first data block is located; and reading the target object data from the first data block of the first object block group.

Optionally, the index block includes a primary index block and a backup index block; the primary index block is configured to store an index of object data, and the backup index block is configured to back up the index of the object data;

for each object block group, a primary index block in the object block group is located at a head of the object block group, and a backup index block in the object block group is located at a tail of the object block group; a data block in the object block group is located between the primary index block and the backup index block of the object block group;

the step of determining a first data block corresponding to the target object data according to an identifier of the target object data, the metadata in the primary metadata block, the metadata backed up in the backup metadata block, and an index in the index block in each object block group, and determining a first object block group in which the first data block is located includes:

reading the metadata in the primary metadata block and/or the metadata backed up in the backup metadata block, and determining locations of the primary index block and the backup index block in each object block group;

reading the index in the primary index block or the index backed up in the backup index block at the determined locations; and determining the first data block corresponding to the target object data according to the read index and the identifier of the target object data, and determining the first object block group in which the first data block is located.

Optionally, the disk further includes at least one reserved block; and the method further includes:

when reading the metadata in the primary metadata block fails, or reading the metadata backed up in the backup metadata block fails, or reading the index in the primary index block in each object block group fails, or reading the index backed up in the backup index block in each object block group fails, determining the object block whose reading operation fails as a suspected bad block, and re-writing and/or re-reading object data into/from the suspected bad block;

if re-writing and/or re-reading the object data succeeds, repairing data in the suspected bad block according to primary and backup redundant data; and if re-writing and/or re-reading the object data fails, obtaining a reserved block and replacing the suspected bad block with the reserved block; overwriting the obtained reserved block according to the primary and backup redundant data, and updating the metadata in the primary metadata block and the metadata backed up in the backup metadata block.

Optionally, the step of determining a data block corresponding to the target object data according to an identifier of the target object data, the metadata in the primary metadata block, the metadata backed up in the backup metadata block, and an index in the index block in each object block group includes:

calculating a first index check value of the identifier of the target object data;

acquiring an identifier of the first data block and a first data length for the first index check value from a preset index database; wherein the preset index database is configured to store a corresponding relationship among an index check value, an identifier of a data block, and a data length; the index check value stored in the preset index database is determined according to the metadata in the primary metadata block, the metadata backed up in the backup metadata block, and the index in the index block in each object block group; and determining the first data block according to the identifier of the first data block;

the step of reading the target object data from the first data block of the first object block group includes:

reading the target object data with the first data length from the first data block of the first object block group.

In the above embodiment, the disk includes a primary metadata block storing metadata, a backup metadata block for backing up metadata, and at least one object block group. Each object block group includes a data block storing object data, and an index block storing an index of the object data. The primary metadata block is located at a head of the disk. The backup metadata block is located at a tail of the disk. The at least one object block group is located between the primary metadata block and the backup metadata block. In this way, when object data in read and written, the index in the index block, the metadata in the primary metadata block and the metadata backed up in the backup metadata block can be separately operated. The critical data, that is, the index and the primary metadata and backup metadata, are distributed in different areas. When object data is read and written, the operations on the critical data are not concentrated in one area, which reduces the probability that the operation frequency of one area is too high, and reduces the probability of accessing index hotspot data, thereby increasing the life and security of the disk.

An embodiment of the present disclosure also provides a storage medium for storing an application program, and the application program performs the above method for writing disk data when being executed. In the method for writing disk data, the disk includes: a primary metadata block storing metadata, a backup metadata block for backing up metadata, and at least one object block group. Each object block group includes: a data block storing object data, an index block storing an index of the object data. The primary metadata block is located at a head of the disk; and the backup metadata block is located at a tail of the disk. The at least one object block group is located between the primary metadata block and the backup metadata block. The method includes:

receiving a writing instruction for target object data;

determining an idle first data block in the at least one object block group, and determining a first object block group corresponding to the first data block; and writing the target object data into the first data block of the first object block group, and updating an index in an index block in the first object block group, the metadata in the primary metadata block and the metadata backed up in the backup metadata block according to an identifier of the target object data.

Optionally, the index block includes a primary index block and a backup index block; the primary index block is configured to store an index of object data, and the backup index block is configured to back up the index of the object data;

for each object block group, a primary index block in the object block group is located at a head of the object block group, and a backup index block in the object block group is located at a tail of the object block group; a data block in the object block group is located between the primary index block and the backup index block of the object block group;

the step of updating an index in an index block in the first object block group, the metadata in the primary metadata block and the metadata backed up in the backup metadata block according to an identifier of the target object data includes:

writing the identifier of the target object data as an index into a primary index block in the first object block group, writing the identifier of the target object data as an index into a backup index block in the first object block group, updating metadata corresponding to the first data block in the primary metadata block, and backing up the metadata corresponding to the first data block into the backup metadata block.

Optionally, the disk further includes at least one reserved block; the method further includes:

when updating the index in the primary index block in the first object block group fails, or updating the index backed up in the backup index block in the first object block group fails, or updating the metadata in the primary metadata block fails, or updating the metadata backed up in the backup metadata block fails, determining the object block whose updating operation fails as a suspected bad block, and re-writing and/or re-reading object data into/from the suspected bad block;

if re-writing and/or re-reading the object data succeeds, repairing critical data in the suspected bad block according to primary and backup redundant data; and if re-writing and/or re-reading the object data fails, obtaining a reserved block and replacing the suspected bad block with the reserved block; overwriting the obtained reserved block according to the primary and backup redundant data, and updating the metadata in the primary metadata block and the metadata backed up in the backup metadata block.

Optionally, after updating an index in an index block in the first object block group, the metadata in the primary metadata block and the metadata backed up in the backup metadata block according to an identifier of the target object data, the method further includes:

calculating a first index check value of the identifier of the target object data; and storing the first index check value, the identifier of the first data block, and a first data length of the target object data into a preset index database correspondingly; wherein the preset index database is configured to store a corresponding relationship among an index check value, an identifier of a data block, and a data length.

In the above embodiment, the disk includes a primary metadata block storing metadata, a backup metadata block for backing up metadata, and at least one object block group. Each object block group includes a data block storing object data, and an index block storing an index of the object data. The primary metadata block is located at a head of the disk. The backup metadata block is located at a tail of the disk. The at least one object block group is located between the primary metadata block and the backup metadata block. In this way, when object data in read and written, the index in the index block, the metadata in the primary metadata block and the metadata backed up in the backup metadata block can be separately operated. The critical data, that is, the index and the primary metadata and backup metadata, are distributed in different areas. When object data is read and written, the operations on the critical data are not concentrated in one area, which reduces the probability that the operation frequency of one area is too high, and reduces the probability of accessing index hotspot data, thereby increasing the life and security of the disk.

For embodiments of the apparatus for reading disk data, the apparatus for writing disk data, the electronic device, the application program and the storage medium, the description thereof is relatively simple since they are basically similar to the embodiments of the method for reading disk data and the method for writing disk data. For relevant contents, the reference can be made to the embodiments of the method for reading disk data shown in FIG. 2 to FIG. 6 and the method for writing disk data shown in FIG. 8 to FIG. 10.

It should be noted that, relationship terms such as "first," "second" and the like herein are only used to distinguish one entity or operation from another entity or operation, and do not necessarily require or imply that there is any such actual relationship or order between those entities or operations. Moreover, the terms "include," "comprise" or any other variants are intended to cover a non-exclusive inclusion, such that processes, methods, objects or devices comprising a series of elements include not only those elements, but also other elements not specified or the elements inherent to those processes, methods, objects, or devices. Without further limitations, an element limited by the phrase "comprise(s) a . . . " and "include(s) a . . . " do not exclude that there are other identical elements in the processes, methods, objects, or devices that comprise that element.

A person skilled in the art can understand that all or part of the steps in implementing the foregoing method embodiments can be completed by instructing a related hardware through a program, and the program can be stored in a computer readable storage medium, such as ROM/RAM, disk, CD, and the like.

The above description is only the preferred embodiments of the present disclosure, and is not intended to limit the protection scope of the present disclosure. Any modifications, equivalent substitutions, improvements, and the like made within the spirit and principles of the present disclosure fall within the scope of the present disclosure.

The invention claimed is:

1. A method for reading disk data, wherein a disk comprises a primary metadata block storing metadata, a backup metadata block for backing up the metadata, and at least one object block group; each object block group comprises a data block storing object data, and an index block storing an index of the object data; the primary metadata block is located at a head of the disk; the backup metadata block is located at a tail of the disk; the at least one object block group is located between the primary metadata block and the backup metadata block; the index block comprises a primary index block and a backup index block; the primary index block is configured to store an index of object data, and the backup index block is configured to back up the index of the object data; for each object block group, a primary index block in the object block group is located at a head of the object block group, and a backup index block in the object block group is located at a tail of the object block group; a data block in the object block group is located between the primary index block and the backup index block of the object block group; the method comprises:

receiving a read instruction for target object data;

determining a first data block corresponding to the target object data according to an identifier of the target object data, the metadata in the primary metadata block, the metadata backed up in the backup metadata block, and an index in the index block in each object block group, and determining a first object block group in which the first data block is located;

reading the target object data from the first data block of the first object block group.

2. The method according to claim 1, wherein, the step of determining a first data block corresponding to the target object data according to an identifier of the target object data, the metadata in the primary metadata block, the metadata backed up in the backup metadata block, and an index in the index block in each object block group, and determining a first object block group in which the first data block is located comprises:

reading the metadata in the primary metadata block and/or the metadata backed up in the backup metadata block, and determining locations of the primary index block and the backup index block in each object block group;

reading the index in the primary index block or the index backed up in the backup index block at the determined locations; and determining the first data block corresponding to the target object data according to the read index and the identifier of the target object data, and determining the first object block group in which the first data block is located.

3. The method according to claim 2, wherein, the disk further comprises at least one reserved block; and the method further comprises:

when reading the metadata in the primary metadata block fails, or reading the metadata backed up in the backup metadata block fails, or reading the index in the primary index block in each object block group fails, or reading the index backed up in the backup index block in each object block group fails, determining an object block whose reading operation fails as a suspected bad block, and re-writing and/or re-reading object data into/from the suspected bad block;

if re-writing and/or re-reading the object data succeeds, repairing data in the suspected bad block according to primary and backup redundant data;

if re-writing and/or re-reading the object data fails, obtaining a reserved block and replacing the suspected bad block with the reserved block; overwriting the obtained reserved block according to the primary and backup redundant data, and updating the metadata in the primary metadata block and the metadata backed up in the backup metadata block.

4. The method according to claim 1, wherein, the step of determining a data block corresponding to the target object data according to an identifier of the target object data, the metadata in the primary metadata block, the metadata backed up in the backup metadata block, and an index in the index block in each object block group comprises:

calculating a first index check value of the identifier of the target object data;

acquiring an identifier of the first data block and a first data length for the first index check value from a preset index database; wherein the preset index database is configured to store a corresponding relationship among an index check value, an identifier of a data block, and a data length; the index check value stored in the preset index database is determined according to the metadata in the primary metadata block, the metadata backed up in the backup metadata block, and the index in the index block in each object block group;

determining the first data block according to the identifier of the first data block;

the step of reading the target object data from the first data block of the first object block group comprises:

reading the target object data with the first data length from the first data block of the first object block group.

5. An electronic device, wherein the electronic device comprises a processor, a communication interface, a memory, and a communication bus; wherein the processor, the communication interface, and the memory communicate with each other through the communication bus;

the memory is configured to store an application program;

the processor is configured to perform the method according to claim 1.

6. A non-transitory storage medium, wherein the storage medium stores an application program, and the application program performs the method according to claim 1 when being executed.

7. A method for writing disk data, wherein a disk comprises: a primary metadata block storing metadata, a backup metadata block for backing up the metadata, and at least one object block group; each object block group comprises: a data block storing object data, and an index block storing an index of the object data; the primary metadata block is located at a head of the disk; and the backup metadata block is located at a tail of the disk; the at least one object block group is located between the primary metadata block and the backup metadata block;

the index block comprises a primary index block and a backup index block; the primary index block is configured to store an index of object data, and the backup index block is configured to back up the index of the object data; for each object block group, a primary index block in the object block group is located at a head of the object block group, and a backup index block in the object block group is located at a tail of the object block group; a data block in the object block group is located between the primary index block and the backup index block of the object block group; the method comprises:

receiving a writing instruction for target object data;

determining an idle first data block in the at least one object block group, and determining a first object block group corresponding to the first data block; and writing the target object data into the first data block of the first object block group, and updating an index in an index block in the first object block group, the metadata in the primary metadata block and the metadata backed up in the backup metadata block according to an identifier of the target object data.

8. The method according to claim 7, wherein, the step of updating an index in an index block in the first object block group, the metadata in the primary metadata block and the metadata backed up in the backup metadata block according to an identifier of the target object data comprises:

writing the identifier of the target object data as an index into a primary index block in the first object block group, writing the identifier of the target object data as an index into a backup index block in the first object block group, updating metadata corresponding to the first data block in the primary metadata block, and backing up the metadata corresponding to the first data block into the backup metadata block.

9. The method according to claim 8, wherein, the disk further comprises at least one reserved block; the method further comprises:

when updating the index in the primary index block in the first object block group fails, or updating the index backed up in the backup index block in the first object block group fails, or updating the metadata in the primary metadata block fails, or updating the metadata backed up in the backup metadata block fails, determining an object block whose updating operation fails as a suspected bad block, and re-writing and/or re-reading object data into/from the suspected bad block;

if re-writing and/or re-reading the object data succeeds, repairing critical data in the suspected bad block according to primary and backup redundant data;

if re-writing and/or re-reading the object data fails, obtaining a reserved block and replacing the suspected bad block with the reserved block; overwriting the obtained reserved block according to the primary and backup redundant data, and updating the metadata in the primary metadata block and the metadata backed up in the backup metadata block.

10. The method according to claim 7, wherein, after updating an index in an index block in the first object block group, the metadata in the primary metadata block and the metadata backed up in the backup metadata block according to an identifier of the target object data, the method further comprises:

calculating a first index check value of the identifier of the target object data; and storing the first index check value, the identifier of the first data block, and a first data length of the target object data into a preset index database correspondingly; wherein the preset index database is configured to store a corresponding relationship among an index check value, an identifier of a data block, and a data length.

11. An electronic device, wherein the electronic device comprises a processor, a communication interface, a memory, and a communication bus; wherein the processor, the communication interface, and the memory communicate with each other through the communication bus;

the memory is configured to store an application program;

the processor is configured to performs the method according to claim 7.

12. A non-transitory storage medium, wherein the storage medium stores an application program, and the application program performs the method according to claim 7 when being executed.

* * * * *